Figures 1, 2, 3:
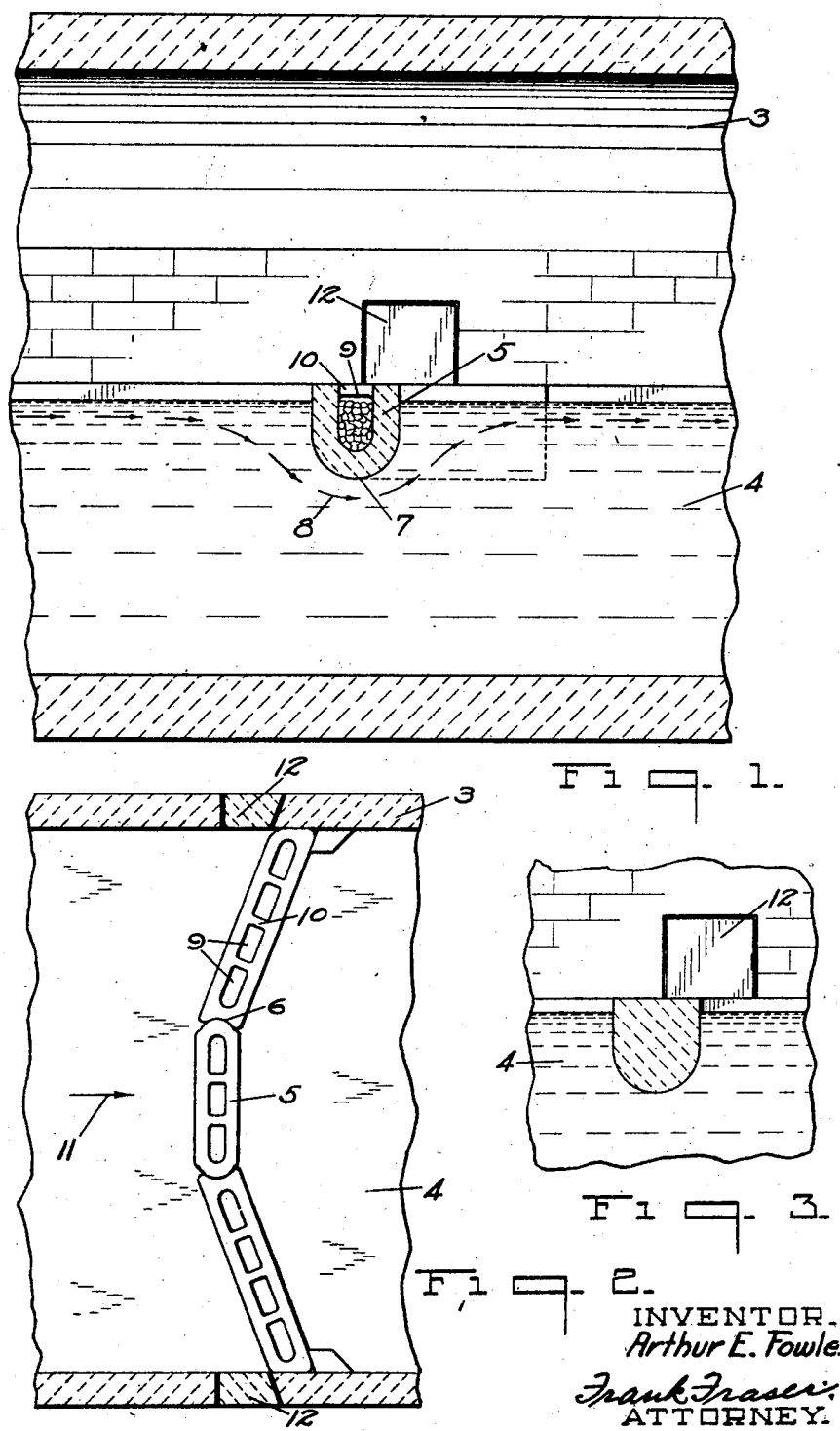

Jan. 11, 1927.

A. E. FOWLE 1,614,114

FLOATER

Filed April 2, 1925

INVENTOR.
Arthur E. Fowle.
Frank Fraser
ATTORNEY.

Patented Jan. 11, 1927.

UNITED STATES PATENT OFFICE.

ARTHUR E. FOWLE, OF TOLEDO, OHIO, ASSIGNOR TO THE LIBBEY-OWENS SHEET GLASS COMPANY, OF TOLEDO, OHIO, A CORPORATION OF OHIO.

FLOATER.

Application filed April 2, 1925. Serial No. 20,274.

The present invention relates to glass apparatus, and has particular reference to means for improving the quality of glass from which the manufactured articles are produced.

An object of the invention is to provide a glass furnace in which is disposed means capable of permitting the top surface or scum of the glass to be removed, while at the same time the said means will offer the least possible resistance to the flow of sub-surface and clear glass.

Another object of the invention is to provide a glass furnace containing a mass of molten glass, and includes a floater means arranged in the glass and adapted to retard and dam up the surface glass or scum present on the mass of glass while at the same time the said floater means will have a bottom surface shaped to offer the least possible resistance to the flow of sub-surface glass which moves toward the point of draw or removal from the tank furnace.

Other objects and advantages of the invention will become apparent during the course of the following description.

In the drawings wherein like numerals are employed to designate like parts throughout the same, Fig. 1 is a fragmentary vertical longitudinal section through a portion of the apparatus disclosing my improved construction, Fig. 2 is a plan view thereof, and Fig. 3 is a sectional view of a modified form.

In the manufacture of sheet glass and other glass articles, a batch of materials is introduced within a suitable furnace where it is subjected to a high heat to produce a molten mass of glass which is flowed or moved toward the point of emergence. Due to the fact that foreign matter is introduced with the batch and also because it is almost impossible to produce an entirely homogeneous mass, a scum or comparatively dirty surface is formed on the mass of glass. To preface vent this scum or comparatively poor quality of glass passing into the glass articles being manufactured, it is desirable to skim off or prevent this surface of scum from moving to the point where the glass is formed into an article of manufacture.

To accomplish this skimming a so-called floater member is arranged in the glass and is adapted to dam up or retard the upper surface of the glass so that this portion can be removed through the sides of the tank furnace.

In Figs. 1 and 2 is shown an improved form of floater. The numeral 3 designates any form of tank furnace or a glass receptacle in which is disposed a mass of molten glass 4. It is to be remembered that the glass 4 can be made from any suitable batch so that a sheet, bottles, tumblers, etc. can be formed, the article being manufactured determining the type of batch. In other words, my improved construction is adaptable to any class of glass manufacture.

The floater 5, as is shown in Fig. 2, is preferably formed from a plurality of sections which abut as at 6 at their ends to create a continuous dam across the entire width of the furnace or channel 3. My improved form of floater is provided with a curved lower surface or bottom 7. As the floaters now in use are formed from a refractory clay material, difficulty has been experienced, due to the action of the molten glass upon this material. Ordinarily the floaters used are merely slabs of clay material having sharp edges which are eaten away or caused to be broken off from the main body of the floater. Obviously, the pieces of refractory clay thus released into the mass of glass prove detrimental to the manufacture of first-class glass products.

In using a floater having the curved bottom 7 no sharp edges are presented upon which the glass can act. With such a construction the particles of clay eaten away by the molten glass is negligible, and at the same time the least possible resistance is offered to the flow of good glass as is indicated by the arrows 8.

To hold the sections in position the floater is formed in a manner to have a plurality of pockets 9 separated by the webs or partitions 10. The pockets 9 are filled with a ballast such as molten glass or cullet. The amount of cullet or ballast used will depend upon the depth at which it is desired to maintain the floater within the glass, and also upon the ratio of specific gravity of the floater and molten glass.

As is shown in Fig. 2, the molten glass 4 is moving in the direction of the arrow 11. The floater members are arranged to create a side movement of the upper surface of glass so that the scum can be skimmed off through the skimming holes 12.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In glass apparatus, means for containing a stream of molten glass and a refractory floater member disposed in the glass and having a closed curved bottom, said floater being provided with means for receiving a ballast to hold the floater to the desired depth.

2. In glass apparatus, means for containing a stream of molten glass and a floater member in the glass for damming up the surface glass and having a curved closed bottom, said floater having pockets formed therein and a ballast disposed in the pockets.

Signed at Toledo, in the county of Lucas, and State of Ohio, this 30th day of March, 1925.

ARTHUR E. FOWLE